United States Patent
Roddy et al.

[11] Patent Number: 6,097,106
[45] Date of Patent: Aug. 1, 2000

[54] VEHICLE SECURITY SYSTEM WITH LOCAL AREA PAGER AND ANTI-DRIVE AWAY PROTECTION

[75] Inventors: Timothy S. Roddy, Plymouth; LeeAnn Marougi, Bloomfield Township; Lloyd Doigan, West Bloomfield; James D. Dowd, Farmington Hills, all of Mich.

[73] Assignee: Lear Automotive Dearborn, Inc., Southfield, Mich.

[21] Appl. No.: 09/196,655

[22] Filed: Nov. 19, 1998

[51] Int. Cl.⁷ ..................................................... B60R 25/10
[52] U.S. Cl. .................. 307/10.5; 307/10.2; 340/825.69; 341/176; 379/38
[58] Field of Search .................................. 307/10.5, 10.4, 307/10.2, 10.3; 379/46, 38; 340/825.69, 825.72, 425.5, 539, 426; 341/176

[56] References Cited

U.S. PATENT DOCUMENTS

| | | |
|---|---|---|
| 5,195,126 | 3/1993 | Carrier et al. ............................. 379/46 |
| 5,627,529 | 5/1997 | Duckworth et al. ..................... 341/176 |
| 5,652,564 | 7/1997 | Winbush ............................. 340/825.69 |
| 5,705,991 | 1/1998 | Kniffin et al. ...................... 340/825.69 |
| 5,926,086 | 7/1999 | Escareno et al. ........................ 340/426 |

*Primary Examiner*—Albert W. Paladini
*Attorney, Agent, or Firm*—Brooks & Kushman P.C.

[57] ABSTRACT

A vehicle security system includes a local area pager and additional anti-drive away protection. The remote transmitter of the system preferably includes a housing that is separated into two portions. A first portion is retained by the vehicle owner while a second portion is provided to a parking attendant with the vehicle. The vehicle owner can use the first portion to generate a signal that is received by the second portion and provides an indication to the parking attendant that the vehicle owner desires the attendant to retrieve the vehicle. Additionally, the system allows the vehicle owner to place the vehicle into a limited operation mode when the vehicle is left with the parking attendant.

19 Claims, 1 Drawing Sheet

VEHICLE SECURITY SYSTEM WITH LOCAL AREA PAGER AND ANTI-DRIVE AWAY PROTECTION

BACKGROUND OF THE INVENTION

This invention generally relates to vehicle security systems. More particularly, this invention relates to a vehicle security system that provides local area paging capabilities and additional anti-drive away protection.

A variety of vehicle security systems are commercially available. Many such systems include remote transmitters for remotely activating a vehicle lock system, for example. While many systems are popular and have proven useful, those skilled in the art are always striving to make improvements.

One situation that has not been addressed by current systems is the situation where a vehicle is entrusted to a valet parking attendant. In most instances, the parking attendant is given the transmitter associated with the vehicle security system. It becomes possible for a potential thief to then obtain the transmitter of the security system from a valet attendant booth, for example. Additionally, a valet attendant or unauthorized user has full access to the entire vehicle because the attendant has the security system transmitter.

It is desirable to provide more security for a vehicle that is entrusted to a valet parking attendant. This invention addresses that need and provides additional advantageous features for a vehicle security system.

SUMMARY OF THE INVENTION

In general terms, this invention is a vehicle security system that includes a system controller supported on the vehicle for controlling the operation of the various components of the vehicle security system. A portable transmitter has at least one switch that is selectively actuatable to generate a signal for communicating with the vehicle system controller. At least one additional switch is provided on the portable transmitter for generating a signal for communicating with at least one other device that is remote from the transmitter and separate from the vehicle.

In one preferred embodiment the other remote device is a local area pager. For example, a child is provided with a receiving device that receives an encrypted, rolling code signal generated by actuating the second switch on the transmitter. A parent who is picking up their child from school, for example, can provide a signal to the child who is waiting safely indoors that the parent has arrived to pick up the child.

In another preferred embodiment the transmitter includes a housing that has two portions. A first portion of the housing supports switches that are useable to generate signals for communicating with the vehicle system controller and a plurality of other remote devices. Additionally, the second portion of the transmitter housing includes a receiver that responds to signals generated by at least one of the switches on the first portion. The first and second portions of the housing are separable so that the first portion can be retained by a vehicle owner while the second portion is provided to a valet parking attendant, for example. The second portion preferably includes an indicator that provides an indication to a parking attendant when a vehicle owner desires the attendant to retrieve the vehicle.

The various features and advantages of this invention will become apparent to those skilled in the art from the following description of the preferred embodiments. The drawings that accompany the detailed description can be briefly described as follows.

DETAILED DESCRIPTION OF THE PREFERRED EMBODIMENT

Figure 1:
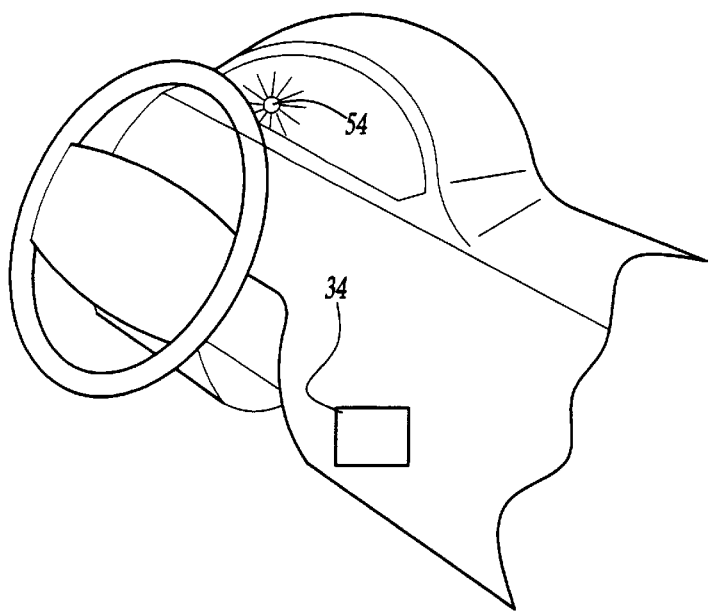
FIG. 1 is a diagrammatic illustration of a security system designed according to this invention.

FIG. 1 illustrates a security system 20 that includes a transmitter 22. In this embodiment, the transmitter 22 is in a key fob that is small enough to be held within a person's hand and carried within a purse, for example. A plurality of switches 24, 26, 28, 30 and 32 are supported on the key fob housing. The switches are selectively activated to generate a signal for communicating with a plurality of devices that are remote from the transmitter 22.

FIG. 1 schematically illustrates a plurality of devices that receive signals from the transmitter 22. A vehicle system controller 34 preferably operates the various components of a vehicle security system such as door locks, trunk lock and an engine kill switch, for example. A home security system 36 preferably receives signals from the transmitter 22 and operates a home security system or various accessories such as interior and exterior lighting responsive to the signals from the transmitter 22. A garage door opener 38 preferably communicates with the transmitter 22 so that a homeowner need not carry about a separate transmitter for operating the garage door.

A local area pager 40 allows the transmitter 22 to be used to communicate with an individual who is located nearby the individual operating the transmitter 22. The pager 40 preferably includes a separate, portable receiver that can be carried about in a person's hand or purse, for example. One preferred use of the local area pager is to allow a parent to notify a child when the parent is ready to pick up the child from school, for example. Rather than requiring the child to wait outside, the child can remain in the safety and security of the school building until receiving a paging signal from the parent that the parent is ready and waiting outside in the vehicle to take the child home. The receiver of the pager 40 preferably provides an audible or visible signal indicating when the receiver has received a verified, encrypted rolling-code signal from the transmitter 22.

An alternative use of the local area pager 40 is in a parking attendant or valet system. In one embodiment, a central receiver preferably is provided at the valet attendant station that receives signals from a plurality of transmitters and indicates which of the vehicle owners desires the attendant to retrieve their vehicle.

The preferred embodiment of the transmitter 22 provides for communication with a valet parking attendant that does not require a separate, central receiver. As shown in FIG. 1, the key fob housing includes a first portion 44 and a second portion 46. The first and second portions are selectively separated from each other. The first and second portions are held together using a conventional fastening device 48, for example. Therefore, when a vehicle owner leaves the vehicle with a parking attendant, the vehicle owner retains the first portion 44 and gives the second portion 46 to the attendant with the vehicle.

The first portion 44 supports the switches 24–30, which allow the vehicle owner to operate the peripheral devices such as a home security and garage door opener. The second portion 46 preferably supports at least one switch 32 that allows the parking attendant to utilize the remote keyless entry feature of the vehicle security system, for example. The second portion 46 also supports a receiver 50 that receives signals from the transmitter in the first portion 44. An indicator 52 provides an indication to the parking attendant when a signal has been received by the receiver 50. Therefore, the vehicle owner can operate one of the switches supported by the first portion 44 to send a signal to the receiver 50 indicating that is the vehicle owner wants the parking attendant to retrieve the vehicle. The indicator 52 preferably includes a visible light and may also include an audible signal or beep to notify the parking attendant of the vehicle owner's wishes.

An additional feature of this invention provides more security to the vehicle when it is left with a parking attendant. One of the switches 24–30 preferably generates a signal that interpreted by the vehicle system controller 34 to place the vehicle into a limited operation mode. This allows the vehicle owner to place limitations on the operation of the vehicle while it is entrusted to the parking attendant. The limited operation mode preferably includes allowing the engine to be started a preselected number of times, such as two. Alternatively, the limited operation mode allows the vehicle to be driven a preselected distance before the system controller 34 prevents the engine from operating. Either of these alternatives are useful for preventing a parking attendant from utilizing the vehicle in an unauthorized manner and prevents a potential thief from driving away with the vehicle.

Figure 2:
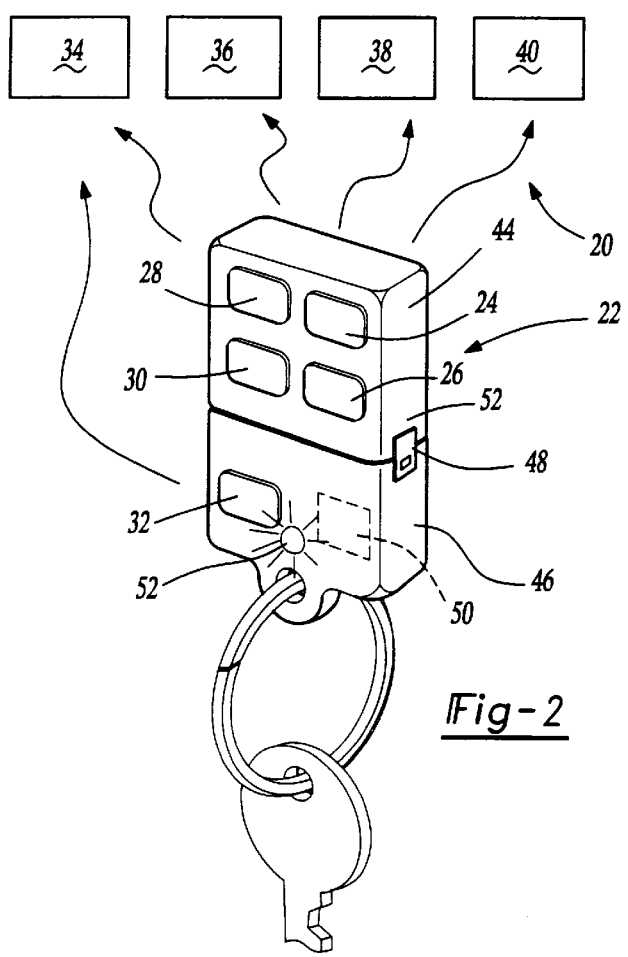
FIG. 2 diagrammatically illustrates a feature of a system designed according to this invention.

FIG. 2 illustrates an additional feature that preferably is provided when the vehicle owner has the option of placing the vehicle into a limited operation mode. An indicator 54 preferably is provided on the instrument panel or dash of the vehicle to provide an indication that the vehicle has been placed into the limited operation mode. The indicator 54 preferably is a light or other visible signal that warns a driver that the vehicle is in a limited operation mode. The vehicle system controller 34 preferably removes the vehicle from the limited operation mode upon receiving an appropriate signal from the transmitter 22.

Figure 3:
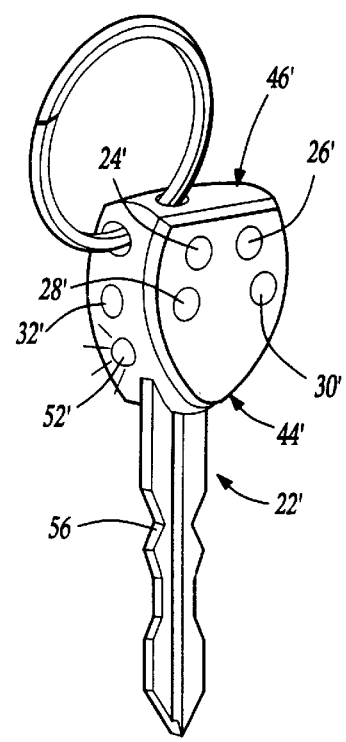
FIG. 3 illustrates an alternative embodiment of a security system designed according to this invention.

FIG. 3 illustrates an alternative embodiment of a system designed according to this invention. The transmitter 22' is supported on a key head 55 that is a portion of a key 56 instead of a key fob as illustrated in FIG. 1. The key head 55 preferably includes a first portion 44' and a second portion 46'. The first and second portions preferably are selectively separated from each other so that a vehicle owner can retain the first portion 44' when leaving the vehicle with a parking attendant, for example. The second portion 46' preferably is large enough to support at least one switch 32' and the indicator 52' along with the receiver that is necessary to receive signals from the first portion 44'. The second portion 46' preferably is configured and large enough to provide the necessary leverage for the desired operation of the key 56 to unlock a door or turn the ignition switch, for example.

In either embodiment, the switches supported by the first portion 44 (or 44') preferably include a feature to reduce undesired or accidental activations. For example, each switch may need to be pressed for a minimum of two seconds before a signal is generated. Alternatively, the housing and switches are configured to prevent inadvertent switch activation, when the transmitter 22 is in a user's purse, for example.

FIG. 2 illustrates another alternative embodiment having a transmitter 60 permanently mounted in the vehicle. The transmitter 60 is useful for communicating with a local area pager, garage door opener, home security devices or other receivers as described above.

Given this description, those skilled in the art will be able to realize the various components and features of this invention by selecting from commercially available components and custom designing any additional circuitry or software that may be needed. For example, the controller 34 can be a conventional microprocessor programmed as known in the art to accomplish the locking and unlocking features mentioned above.

All remote communication signals preferably include encryption and utilize a rolling code scheme to provide greater system security.

The description just given provides details regarding the currently preferred embodiments of this invention. Variations and modifications may become apparent to those skilled in the art that do not necessarily depart from the purview and spirit of this invention. The scope of legal protection given to this invention can only be determined by studying the following claims.

What is claimed is:

1. A vehicle security system comprising:
    a system controller supported by the vehicle that is operative to control selected functions of the vehicle security system; and
    a portable transmitter having a first switch that is selectively actuatable to generate a signal for communicating with the vehicle system controller, and at least a second switch that is selectively actuatable to generate a signal for communicating with at least one other device remote from the transmitter and separate from the vehicle.

2. The system of claim 1, wherein there are a plurality of other devices and wherein the devices include a garage door opener, a home security controller and a local area pager.

3. The system of claim 1, further comprising a local area pager having a receiver portion that receives the signal from the transmitter generated by actuation of the second switch and wherein the pager produces a signal indicative of the signal received from the transmitter.

4. The system of claim 1, further comprising a transmitter housing having a first portion supporting the second switch and a second portion supporting a receiver and an indicator, the first and second portions being selectively separable from each other and wherein the receiver of the second portion receives the signal generated by actuating the second switch and the indicator responsively provides an indication of the reception of the signal.

5. The system of claim 4, wherein the indicator provides at least one of an audible sound or a visible indication.

6. The system of claim 4, wherein the transmitter housing comprises a key fob.

7. The system of claim 4, wherein the transmitter housing is supported on a key.

8. The system of claim 1, wherein actuation of the second switch provides a second and a third signal and wherein the system controller places the vehicle into a limited operation mode responsive to the second signal and removes the vehicle from the limited operation mode responsive to the third signal.

9. The system of claim 8, further comprising an indicator supported by the vehicle that provides an indication to a vehicle operator when the vehicle is in the limited operation mode.

10. A vehicle security system, comprising:

a controller supported on the vehicle that controls the operation of the security system;

a portable transmitter housing that supports a transmitter that generates signals and a plurality of switches that are selectively activatable to cause the transmitter to transmit the signals, the housing including a first portion that supports the transmitter and a second portion that is selectively separable from the first portion;

a receiver supported by the second housing portion that receives at least one signal from the transmitter; and an indicator supported by the second housing portion that provides an indication that a signal has been received by the receiver.

11. The system of claim 10, wherein the transmitter housing comprises a key fob.

12. The system of claim 10, wherein the transmitter housing comprises a key head.

13. The system of claim 10, wherein the plurality of switches are supported by the first housing portion and at least some of the switches are activatable to generate signals for communicating with devices that are remote from the transmitter and separate from a vehicle.

14. The system of claim 10, wherein the controller places the vehicle into a limited operation mode responsive to one of the signals from the transmitter and removes the vehicle from the limited operation mode responsive to another one of the signals from the transmitter.

15. A vehicle security system, comprising:

a controller supported by the vehicle that controls the operation of the security system;

a portable transmitter that is useable to generate a plurality of signals for communicating with the vehicle security system and at least one other device remote from the transmitter and separate from the vehicle and wherein the controller places the vehicle into a limited operation mode responsive to one of the signals from the transmitter and removes the vehicle from the limited operation mode responsive to another one of the signals from the transmitter; and an indicator in the vehicle that provides an indication when the vehicle is in the limited operation mode.

16. The system of claim 15, further comprising a transmitter housing having a first portion and a second portion supporting a receiver and an indicator, the first and second portions being selectively separated from each other and wherein the receiver of the second portion receives one of the signals generated by the transmitter and the indicator responsively provides an indication of the reception of the signal.

17. The system of claim 16, wherein the indication is one or more of the group consisting of audible and visible.

18. The system of claim 15, wherein the limited operation mode includes only allowing the vehicle ignition to start the engine a preselected number of times.

19. The system of claim 15, wherein the limited operation mode includes only allowing the vehicle to travel a preselected distance before the vehicle is disabled.

\* \* \* \* \*